United States Patent [19]
Kozawa et al.

[11] Patent Number: 4,647,595
[45] Date of Patent: Mar. 3, 1987

[54] PROCESS FOR PRODUCING A URETHANE-MODIFIED POLYISOCYANURATE FOAM

[75] Inventors: Shigeyuki Kozawa; Nobuaki Kunii; Yukio Matsumoto, all of Yokohama, Japan

[73] Assignee: Asahi Glass Company, Ltd., Tokyo, Japan

[21] Appl. No.: 788,725

[22] Filed: Oct. 17, 1985

[51] Int. Cl.$^4$ ............................................. C08G 18/14
[52] U.S. Cl. ................................... 521/158; 521/172; 521/173
[58] Field of Search ........................ 521/158, 172, 173

[56] References Cited

U.S. PATENT DOCUMENTS

| | | | |
|---|---|---|---|
| 4,039,487 | 4/1977 | Kolakowski et al. | 521/112 |
| 4,246,365 | 1/1981 | Wiedermann et al. | 521/172 |
| 4,307,205 | 12/1981 | Bershas | 521/172 |
| 4,336,341 | 6/1982 | Fujiwara et al. | 521/172 |
| 4,400,477 | 8/1983 | Blanpied | 521/112 |
| 4,469,824 | 9/1984 | Grigsby et al. | 521/172 |

*Primary Examiner*—Maurice J. Welsh
*Attorney, Agent, or Firm*—Oblon, Fisher, Spivak, McClelland & Maier

[57] ABSTRACT

A process for producing a urethane-modified polyisocyanurate foam by using at least four components of a polyol, a polyisocyanate compound in an excess amount relative to the polyol, an isocyanate trimerizing catalyst and a foaming agent, as the essential starting materials, wherein a polyester ether polyol comprising, as the constituting units, residues of polyhydric phenols and/or polyhydric alcohols, residues of polybasic carboxylic acids and oxyalkylene groups and having a hydroxyl value of from about 100 to about 500, is employed as at least a part of said polyol.

14 Claims, No Drawings

PROCESS FOR PRODUCING A URETHANE-MODIFIED POLYISOCYANURATE FOAM

BACKGROUND OF THE INVENTION

1. Field of the Invention

The present invention relates to a process for producing a urethane-modified polyisocyanurate foam. More particularly, it relates to a process for producing a urethane-modified polyisocyanurate foam, wherein a certain specific polyol is employed.

2. Description of the Prior Art

A polyisocyanurate foam is a hard foam having excellent heat resistance and flame resistance, which is obtainable by polymerizing a polyisocyanate compound in the presence of a foaming agent and an isocyanate trimerizing catalyst. However, such a foam is extremely brittle, and it is difficult to use it for a practical application. Therefore, it is common to use a small amount of a polyol together with the polyisocyanate compound to obtain a urethane-modified polyisocyanurate foam containing urethane bonds. The polyol is used usually in an amount of at least about 2 by the ratio in the number of isocyanate groups/hydroxyl groups. Usually, the smaller the amount of the polyol, the less the effectiveness for the improvement against brittleness. On the other hand, as the amount of the polyol increases, the heat resistance or the flame resistance deteriorates, and the flammability increases. The change of these physical properties varies also depending upon the type of the polyol. Accordingly, for the same amount, the polyol is desired to provide higher effectiveness for the improvement against brittleness, less deterioration of the heat resistance or flame resistance and higher fire retardancy. As known polyols, there may be mentioned polyhydric alcohols such as ethylene glycol, propylene glycol and trimethylol propane; polyalkylene glycols such as polyethylene glycol and polypropylene glycol; polyether polyols having relatively low molecular weights, which are obtainable by the addition of an alkylene oxide to an initiator such as a polyhydric alcohol, a polyhydric phenol or an amine; polyester polyols having relatively low molecular weights; and combinations of these low molecular weight polyols with polyether polyols having relatively high molecular weights. However, in many cases, such conventional polyols do not fully satisfy the required properties, and polyols having better functional properties are desired.

In many cases, polyols are required to provide not only the above-mentioned functional properties for the improvement of the physical properties of the foam, but also other functional properties. One of them is a question of the compatibility in the use of a halogenated hydrocarbon foaming agent. Polyols having relatively high hydrophilic properties, such as polyhydric alcohols, polyethylene glycols, polyether polyols having a high content of oxyethylene groups or polyester polyols, have relatively low compatibility with a foaming agent, and their mixtures with a foaming agent have a difficulty that they are likely to undergo phase separation. On the other hand, polyols having high hydrophobic properties such as polyether polyols having a high content of oxypropylene groups have good compatibility with foaming agents, but have a difficulty that the physical properties of the foam thereby obtained, such as the fire retardancy, are poor. As a means to solve these two problems, there has been proposed a method in which a polyester polyol and a polyether polyol obtainable by the addition of propylene oxide to a polyhydric alcohol are incorporated (Japanese Examined Patent Publication No. 22052/1982). However, in this method, the compatibility of the polyester polyol with the polyether polyol is low, and the foaming agent tends to be dissolved preferentially in the polyether polyol side. Accordingly, it can hardly be said that the above-mentioned problem of compatibility has been adequately solved.

SUMMARY OF THE INVENTION

The present inventors have conducted various researches to obtain a polyol which is excellent in the improvement of the physical properties of the urethane-modified polyisocyanurate foam, and at the same time have studied polyols from the above-mentioned viewpoint of the compatibility with foaming agents. As a result, it has been found that a polyester ether polyol in which the hydrophilic properties and the hydrophobic properties are well balanced, is superior in the improvement of the physical properties of the foam. This polyol has well balanced hydrophilic properties and hydrophobic properties, and thus has excellent compatibility with the foaming agent. The present invention is directed to a process for producing a polyurethane-modified polyisocyanurate foam in which this polyester ether polyol is used.

Namely, the present invention provides a process for producing a urethane-modified polyisocyanurate foam by using at least four components of a polyol, a polyisocyanate compound in an excess amount relative to the polyol, an isocyanate trimerizing catalyst and a foaming agent, as the essential starting materials, wherein a polyester ether polyol comprising, as the constituting units, residues of polyhydric phenols and/or polyhydric alcohols, residues of polybasic carboxylic acids and oxyalkylene groups and having a hydroxyl value of from about 100 to about 500, is employed as at least a part of said polyol.

DETAILED DESCRIPTION OF THE PREFERRED EMBODIMENTS

Now, the present invention will be described in detail with reference to the preferred embodiments.

Firstly, the polyester ether polyol in the present invention will be described. First of all, certain special definitions used in the present invention will be explained. Among polyhydric alcohols, alkylene glycols such as ethylene glycol or propylene glycol may be regarded as containing an oxyalkylene group. However, in the present invention, these alkylene glycols are classified into a category of polyhydric alcohols. Further, polyethylene glycols such as diethylene glycol or triethylene glycol, polypropylene glycols such as dipropylene glycol or tripropylene glycol and other polyalkylene glycols are classified in the category of polyhydric alcohol-alkylene oxide adducts in the present invention, even though they are not produced by the addition reaction of an alkylene oxide. Namely, for instance, diethylene glycol is regarded as a compound obtained by the addition of one molecule of ethylene oxide to one molecule of ethylene glycol. Likewise, dipropylene glycol is regarded as a compound obtained by the addition of one molecule of propylene oxide to one molecule of propylene glycol. Futhermore, a compound obtained by the addition of more than the stoichiometric amount of an alkylene oxide to a polyhydric phenol, may be regarded as a kind of polyhydric alcohols. However, in the present invention, such a compound is regarded as a polyhydric phenol-alkylene oxide adduct. Although an oxyalkylene group is a group derived from an alkylene oxide, there is an exception as above.

The polyester ether polyol in the present invention is a polyester ether polyol which essentially contains at least three types of constituting units, i.e. residues of polyhydric phenols and/or polyhydric alcohols as defined above, residues of polybasic carboxylic acids and oxyalkylene groups. Its hydroxyl value is required to be within a range of from about 100 to about 500, preferably within a range of from about 150 to about 400. The polyester ether polyol may contain carboxylic acid groups or phenolic hydroxyl groups, but the acid value of the polyester ether polyol should preferably be at most 2, particularly at most 1. In the polyester ether polyol, the average proportion of each constituting unit is not particularly limited. However, the number of the residues of the polybasic carboxylic acids is usually from 0.5 to 2.0, preferably from 0.8 to 1.5 relative to one residue of the polyhydric phenol and/or the polyhydric alcohol. Likewise, the number of oxyalkylene groups is at least 1.5, preferably at least 2.0 and not higher than the amount where a polyester ether polyol having a hydroxyl value of not less than the above-mentioned lower limit is obtained. Further, the number of the oxyalkylene groups is preferably at least 1.0, more preferably at least 2.0, relative to the total number of the residues of the polyhydric phenols and/or the polyhydric alcohols and the residues of the polybasic carboxylic acids.

From the physical properties of the foam, it is preferred to employ a polyester ether polyol containing substantial amounts of ester groups, oxyethylene groups and ethylene glycol residues. On the other hand, from the viewpoint of the compatibility with a foaming agent, it is preferred to employ a polyester ether polyol having substantial amounts of oxyalkylene groups having at least 3 carbon atoms and polyhydric alcohol residues having a large amount of carbon atoms. Further, the present inventors have found that an aromatic ring such as a benzene ring serves to improve the compatibility with the foaming agent. Therefore, it is preferred that the polyester ether polyol contains an aromatic ring as well as oxyethylene groups and/or ethylene glycol residues. Accordingly, the residues of the polybasic carboxylic acids are preferably residues of aromatic polybasic carboxylic acids. Furthermore, the residues of the polyhydric phenols and/or polyhydric alcohols are preferably at least residues of the polyhydric phenols. Of course, they may be residues of polyhydric alcohols having aromatic rings (other than polyhydric phenol-alkylene oxide adducts), but they are preferably residues of polyhydric phenols which are more common. The oxyalkylene groups are preferably such that at least a part thereof is oxyethylene groups. It is preferred that in the total oxyalkylene groups, the oxyethylene groups constitute from about 30 to about 100%, more preferably from about 40 to about 80% by the proportion in the number. Accordingly, the most preferred polyester ether polyol is a polyester ether polyol containing residues of polyhydric phenols, residues of aromatic polybasic carboxylic acids and oxyalkylene groups containing at least about 30%, more preferably at least about 40%, by number of oxyethylene groups. Next to the most preferred is a polyester ether polyol which contains at least one type of residues selected from residues of polyhydric phenols and residues of aromatic polybasic carboxylic acids, and ethylene glycol residues in a case where the residues of polyhydric alcohols are contained, and oxyethylene groups in the above-mentioned range as the oxyalkylene groups. The third preferred polyester ether polyols include two types, i.e. a polyester ether polyol comprising residues of polyhydric alcohols containing no aromatic ring, residues of polybasic carboxylic acids containing an aromatic ring and oxyalkylene groups containing oxyethylene groups within the above-mentioned range, and a polyester ether polyol comprising residues of polyhydric phenols and/or residues of polybasic carboxylic acids containing aromatic rings and oxyalkylene groups containing no oxyethylene groups or containing oxyethylene groups outside the above-mentioned range.

The polyhydric phenols and polyhydric alcohols are preferably at least dihydric, particularly from dihydric to octahydric, preferably from dihydric or trihydric, more preferably dihydric. The polybasic carboxylic acids are usually from dibasic to tetrabasic, and particularly preferred are dibasic carboxylic acids. The oxyalkylene groups preferably have from 2 to 4 carbon atoms, and they are particularly preferably composed solely of oxyethylene groups or oxypropylene groups, or a combination of oxyethylene groups and oxypropylene groups.

The total content of the aromatic polybasic carboxylic acid residues and the polyhydric phenol residues in the polyester ether polyol is preferably at least about 10% by weight, more preferably at least about 20% by weight. The upper limit is usually about 55% by weight, but in some cases may be higher. The aromatic polybasic carboxylic acid residue is a residue obtained by removing a hydrogen atom from the carboxyl group of an aromatic polybasic carboxylic acid. Likewise, the polyhydric phenol residue is a residue obtained by removing a hydrogen atom from the phenolic hydroxyl group of a polyhydric phenol. Accordingly, a polyester ether polyol having no polyhydric phenol residue preferably has aromatic polybasic carboxylic acid residues within the above-mentioned range. Likewise, a polyester ether polyol having no aromatic polybasic carboxylic residue preferably has polyhydric phenol residues within the above-mentioned range. If it contains both residues, it is preferred that the total amount is within the above-mentioned range.

The polyester ether polyol in the present invention may be prepared in various methods. The most preferred method for the preparation comprises reacting a polyhydric phenol and/or a polyhydric alcohol or an alkylene oxide adduct thereof with a polybasic carboxylic acid or its derivative such as a acid anhydride, and simultaneously or subsequently reacting an alkylene oxide therewith. A polyhydric phenol reacts with an acid anhydride, but is usually hardly reactive with a carboxylic acid group. Accordingly, when a polyhydric phenol is to be used, it is advisable to preliminarily add at least the stoichiometric amount of an alkylene oxide thereto and to use a polyhydric phenol-alkylene oxide adduct thereby obtained. The acid derivative may be an acid halide or ester. However, it is preferably an acid anhydride. An alkylene oxide readily reacts with a carboxylic acid group. Therefore, a substantial amount of a polybasic carboxylic acid is likely to react with the alkylene oxide before the esterification. Therefore, it is advisable that the alkylene oxide is reacted after the esterification takes place to some extent. However, even if a polybasic carboxylic acid-alkylene oxide adduct is present, there is no substantial adverse effect unless the amount is too much, and accordingly, a product obtainable by reacting the three reactants simultaneously, is also practically useful. Accordingly, the most preferred polyester ether polyol is a product obtained by reacting a polyhydric phenol-alkylene oxide adduct and/or a polyhydric alcohol (or a polyhydric alcohol-alkylene oxide adduct) with a polybasic carboxylic acid or its acid anhydride, followed by the reaction with an alkylene oxide. Next to the most preferred is a product obtained by simultaneously reacting at least the three reactants. The polyester ether polyol in the present invention is not limited to those obtainable by the above method, and may be a product obtainable by reacting an alkylene oxide after the above-mentioned reaction of the polyhydric phenolpolybasic carboxylic acid anhydride. It may also be a polyester ether polyol obtained by reacting an alkylene oxide adduct of a polyhydric phenol and/or a polyhydric alcohol with a polybasic carboxylic acid or its acid derivative.

In many cases, the product obtained by the above method is a mixture comprising the polyester ether polyol as the major component (in many cases, this main component is not a single compound but a mixture) and other by-products or unreacted reactants. However, such a product may be used as it is, so long as the presence of carboxylic acid groups is not more than the above-mentioned limit. Of course, the by-products or unreacted reactants may be removed to some extent as the case requires. Further, each starting material may be a combination of two or more different kinds. Particularly, the alkylene oxide may be different as between the one used for the reaction with the polyhydric phenol or a polyhydric alcohol and the one used for the reaction simultaneously or subsequent to the esterification. The reaction for the production of a polyester ether polyol is usually conducted under heating. The temperature may vary depending upon the type of the starting materials, but is usually not higher than 160° C., preferably from 60° to 140° C. At a high temperature, the reaction may be conducted in the absence of a catalyst. However, it is preferred to use at least one type of an esterification catalyst or a catalyst which promotes the alkylene oxide addition reaction. As such a catalyst, there may be mentioned a tertiary amine catalyst such as triethyl amine, a caustic alkali catalyst such as potassium hydroxide or a metal alkoxide catalyst such as $Ti(OC_4H_9)_4$. The amount of the catalyst is not particularly limited. However, it is usually from 0.01 to 1% by weight.

The proportions for the reaction of the polybasic carboxylic acid or its acid derivative and the alkylene oxide relative to the polyhydric phenol and/or polyhydric alcohol or an alkylene oxide adduct thereof, are preferably in the above-mentioned ranges of the proportions of the respective constituting units. However, both proportions may not necessarily agree because in practice by-products or unreacted substances remain. The amount of the polybasic carboxylic acid or its acid derivative is usually from 0.5 to 2.0 equivalents, particularly from 0.8 to 1.5 equivalents relative to one equivalent of the polyhydric phenol and/or polyhydric alcohol or the alkylene oxide adduct thereof. Namely, the amount is preferably substantially stoichiometric. The amount of the alkylene oxide except for the alkylene oxide preliminarily added to the polyhydric phenol or polyhydric alcohol, may be 0 as mentioned above, but preferably at least 0.5 equivalent and not to bring the above-mentioned hydroxyl value to be lower than the lower limit. More preferably, the amount is from 1 to 5 equivalents. The amount of the alkylene oxide preliminarily added to the polyhydric phenol is at least substantially stoichiometric, particularly from 1 to 3 equivalents, relative to one equivalent of the polyhydric phenol. For instance, in the case of a dihydric phenol, at least substantially two mols, particularly from 2 to 6 mols of the alkylene oxide is suitably used relative to one mol of the dihydric phenol. Particularly preferred is a bis(hydroxyalkylated)dihydric phenol as the stoichiometric adduct. In the case of a polyhydric alcohol, the amount of the addition of alkylene oxide is suitably at least substantially 0.5 equivalent. Namely, according to the above-mentioned definition, for instance, diethylene glycol is regarded as a reaction product of ethylene glycol with 0.5 equivalent of ethylene oxide. The amount is preferably from 0.5 to 2 equivalents.

Preferred starting materials for the respective reactions are the following compounds. In the case of polybasic carboxylic acids, their anhydrides are preferred rather than the acids mentioned below.

Polyhydric phenols:
  Bisphenol A, bisphenol S (bishydroxyphenylsulfone), bisphenol F (bishydroxyphenylmethane)
Polyhydric phenol-alkylene oxide adducts:
  Compounds obtained by adding at least a stoichiometric amount (i.e. at least two mols) of ethylene oxide and/or propylene oxide to the above-mentioned three types of phenols.
Polyhydric alcohols:
  Ethylene glycol, propylene glycol, 1,4-butanediol
Polyhydric alcohol-alkylene oxide adducts:
  Diethylene glycol, dipropylene glycol
Polybasic carboxylic acids:
  Phthalic acid, maleic acid, succinic acid
Alkylene oxides:
  Ethylene oxide, propylene oxide As other useful starting materials, there may be mentioned the following.
Polyhydric phenols:
  Resorcinol, dihydroxy toluene, bis(hydroxyphenyl)-sulfide, polyhalogenated bisphenol A, polyhalogenated bisphenol S, polyhalogenated bisphenol F, phenolformaldehyde precondensate, alkyl-substituted phenolformaldehyde precondensate
Polyhydric phenol-alkylene oxide adducts:
  Compounds obtained by adding a stoichiometric or higher amount of ethylene oxide and/or propylene oxide to the above polyhydric phenols
Polyhydric alcohols:
  Glycerol, trimethylolpropane, pentaerythritol, dextrose, cyclohexanediol, hydrogenated bisphenol A, xylylene glycol
Polyhydric alcohol-alkylene oxide adducts:
  Poly(at least tri)ethylene glycol, poly(at least tri) propylene glycol, compounds obtained by adding ethylene oxide and/or propylene oxide to the above-mentioned polyhydric alcohols or the above-mentioned preferred polyhydric alcohols or the above-mentioned preferred polyhydric alcohol-alkylene oxide adducts
Polybasic carboxylic acids:

Isophthalic acid, terephthalic acid, toluene dicarboxylic acid, trimellitic anhydride, tetrachloro phthalic anhydride, oxalic anhydride, adipic acid Alkylene oxide:

Butene oxide

The starting materials are not restricted to the specific compounds exemplified above. Further, these starting materials may be used in combination as a mixture of two or three different materials in the same category. Futher, in some cases, a halogenated alkylene oxide (such as epichlorohydrin or 4,4,4-trichloro-1,2-butene oxide) or an epoxide other than the alkylene oxide such as styrene oxide may be used in combination with the alkylene oxide. It should also be mentioned that a halogen-containing polyester ether polyol obtainable by using a halogen-containing compound among the above-mentioned starting materials, tends to reduce the physical properties of the urethane-modified polyisocyanurate foam as compared with the one containing no halogen if the amount of its use is small.

The polyester ether polyols of the present invention may be used in combination as a mixture of two or more different types. Particularly, a combination of the above-mentioned most preferred polyester ether polyol containing an aromatic ring (i.e. the one containing residues of polyhydric phenols and residues of aromatic polybasic carboxylic acids) with another polyester ether polyol, particularly the second and third preferred polyester ether polyols, is preferred. In the present invention, at least 50% by weight, particularly from about 70 to about 100% by weight of the total polyols used as the starting materials for the urethane-modified polyisocyanurate foam, is preferably constituted by the above-mentioned polyester ether polyol of the present invention. As another polyol to be used in combination, there may be mentioned polyether polyols obtainable by the addition of alkylene oxides to polyhydric alcohols, polyhydric phenols, polyhydric amines, alkanol amines or other initiators, polyester polyols, polyhydric alcohols or alkanol amines. In some cases, it is possible to use polyols having low hydroxyl values (i.e. high molecular weights) or monohydric alcohols. Preferably, the average hydroxyl value of the mixture with the polyester ether polyols is within a range of from about 100 to 600. It is not essential to use this another polyol. It is preferred to use the polyester ether polyol of the present invention substantially alone.

An aromatic polyisocyanate compound is preferred as the polyisocyanate compound as the main starting material for the urethane-modified polyisocyanurate foam of the present invention. However, an aliphatic or alicyclic polyisocyanate compound may be used as a part or whole thereof. Preferred aromatic polyisocyanate compounds include polymethylenepolyphenyl isocyanate, diphenylmethane diisocyanate and tolylene diisocyanate, but not they are limited to these specific examples. Further, modified products of these aromatic polyisocyanate compounds, such as prepolymer-type modified products, carbodiimide modified products, or urea modified products, may also be used. The polyisocyanate compound is used preferably in an excess amount i.e. at least 1.5, particularly from 2 to 5 by the ratio in the number of isocyanate groups/hydroxyl groups. When represented by the weight ratio, from 5 to 75 parts by weight, particularly from 10 to 50 parts by weight, of polyol is preferred relative to 100 parts by weight of the polyisocyanate compound.

As the isocyanate trimerizing catalyst, there may be employed various kinds of catalysts. For instance, there may be mentioned a metal (such as an alkali metal, lead or iron) salt of a carboxylic acid, a tertiary amine such as a dialkylaminoalkyl phenol or a trialkyl amine, an inorganic base such as caustic potash or sodium carbonate, an alkali metal alcolate, a phosphine such as triethylphosphine, and a quaternary ammonium salt. Particularly preferred is an alkali metal salt of a fatty acid having from 1 to 18 carbon atoms or a quaternary ammonium salt.

As the foaming agent, a halogenated hydrocarbon foaming agent or a combination thereof with water is preferred. As the halogenated hydrocarbon foaming agent, there may be mentioned, for instance, tricholofluoromethane, dichlorofluoromethane or methylene chloride.

The amount of the catalyst or the amount of the foaming agent is not particularly limited. However, from 0.01 to 5 parts by weight of the catalyst and from 5 to 50 parts by weight of the foaming agent are suitable relative to 100 parts by weight of the polyisocyanate compound.

In the present invention, the four components of the polyol, the polyisocyanate compound, the isocyanate trimerizing catalyst and the foaming agent are essential starting materials for the urethane-modified polyisocyanurate foam. However, other starting materials may also be incorporated. As an additive which is preferably used, there may be mentioned a foam stabilizer. As a foam stabilizer, a silicone-type foam stabilizer is preferred which is commonly used for the preparation of polyurethane foam, such as a polysiloxane-polyoxyalkylene block copolymer or a polysiloxane. Various other additives such as a urethane-foaming catalyst, a reinforcing fiber, a filler, a fire retardant, a coloring agent, a stabilizer, etc. are useful as the case requires.

Now, the present inveiont will be described in further detail with reference to Examples. However, it should be understood that the present invention is by no means restricted to these specific Examples.

PREPARATION EXAMPLE (Preparation of polyester ether polyol)

Polyester ether polyol-1 (Polyol A)

Into a 5 liter reactor, 900 g of 1,4-butanediol, 1480 g of phthalic anhydride and 4.5 g of 85% KOH pellets were charged, and the temperature was raised to 120° C. Then, 1220 g of ethylene oxide was introduced while maintaining the reaction temperature at 120° C. After maintaining at 120  C. for 2 hours, unreacted substances were distilled off under reduced pressure.

The polyol thereby obtained had a OH value of 325 and a viscosity of 2400 cp/25° C.

Polyester ether polyol-2 (Polyol B)

In the same manner as above, 1280 g of dipropylene glycol, 1550 g of phthalic anhydride and 1380 g of propylene oxide were reacted.

The polyol thereby obtained had a OH value of 276 and viscosity of 11700 cp/25° C.

Polyester ether polyol-3 (Polyol C)

In the same manner, 2360 g of a polyol obtained by the addition of 3 mols of propylene oxide to 1 mol of bisphenol A, 870 g of phthalic anhydride and 780 g of ethylene oxide were reacted, whereby a polyol having a OH value of 182 and a viscosity of 153000 cp/25° C., was obtained.

Polyester ether polyol-4 (Polyol D)

In the same manner, 2700 g of a polyol obtained by the addition of 4 mols of propylene oxide to 1 mol of bisphenol A, 870 g of phthalic anhydride and 780 g of ethylene oxide were reacted, whereby a polyol having a OH value of 169 and a viscosity of 89500 cp/ 25° C. was obtained.

Polyester ether polyol-5 (Polyol E)

In the same manner, 1640 g of a polyol obtained by the addition of 4 mols of propylene oxide to 1 mol of bisphenol A, 380 g of diethylene glycol, 1060 g of phthalic anhydride and 940 g of ethylene oxide were reacted, whereby a polyol having a OH value of 231 and a viscosity of 15400 cp/25° C. was obtained.

Polyester ether polyol-6 (Polyol F)

In the same manner, 2700 g of a polyol obtained by the addition of 4 mols of propylene oxide to 1 mol of bisphenol A, 590 g of succinic anhydride and 780 g of ethylene oxide were reacted, whereby a polyol having a OH value of 185 and a viscosity of 29700 cp/ 25° C. was obtained.

Polyester ether polyol-7 (Polyol G)

In the same manner, 1340 g of dipropylene glycol, 1000 g of succinic anhydride and 1320 g of ethylene oxide were reacted, whereby a polyol having a OH value of 340 and a viscosity of 350 cp/25° C. was obtained.

(Polyol for the purpose of comparison)

Polyether polyol (Polyol H)

A propylene oxide adduct of pentaerythritol (OH value: 300)

Polyester polyol (Polyol I)

Synthesized from 80% by weight of phthalic acid, 20% by weight of adipic acid and ethylene glycol (OH value: 320)

(Comparative tests for compatibility)

Into 300 cc Erlenmeyer flask, 100 g of a polyol was introduced and adjusted to 25° C. Then, trichloromonofluoromethane (R-11) was gradually added, and the amount of trichlorofluoromethane added until the mixture started to form white turbidity, was taken as the reference for the compartibility. The results are shown in Table 1.

TABLE 1

Comparison in the compatibility

| Polyol | Present invention | | | | | | | Comparative | |
|---|---|---|---|---|---|---|---|---|---|
| | A | B | C | D | E | F | G | H | I |
| Amount of R-11 dissolved (g) | 41 | 100 | 59 | 91 | 78 | 125 | 80 | 147 | 17 |

The polyester ether polyols (Polyols A to G) of the present invention are superior in the compatibility with R-11 to simple polyester polyol I.

EXAMPLES (Preparation of polyisocyanurate foams)

TABLE 2

| Formulations for polyisocyanurate foams | | |
|---|---|---|
| Formulations | I | II |
| Polyol | 15 | 30 |
| Dabco TMR (1) | 1.0 | 1.0 |
| SH 193 (2) | 1.0 | 1.0 |
| R-11 | 20 | 20 |
| PAPI 135 (3) | 85 | 70 |

(1) Dabco TMR: Isocyanate trimerizing catalyst, manufactured by Sankyo Air Products Co.
(2) SH 193: Silicone foam stabilizer, manufactured by Toray Silicone Co.
(3) PAPI 135: Polymethylenepolyphenyl isocyanate, manufactured by Kasei Upjohn Co.

In accordance with the foaming formulations as shown in accordance with the foaming formulations as shown in Table 2, the liquid temperature was adjusted to 20? C., and the mxiture was thoroughly mixed and foamed in a wood panel of 200×200×200 mm. With respect to each polyol, its foaming reactivity and the test results of the physical properties, the heat resistance, the fire retardancy of the polyisocyanurate foam thereby obtained are shown in Table 3.

TABLE 3

Foaming test results

| | Polyols | | | | | | | | | | | | | | | | | |
|---|---|---|---|---|---|---|---|---|---|---|---|---|---|---|---|---|---|---|
| Items Foaming formulation | Example 1 Polyol A | | Example 2 Polyol B | | Example 3 Polyol C | | Example 4 Polyol D | | Example 5 Polyol E | | Example 6 Polyol F | | Example 7 Polyol G | | Comparative Example 1 Polyol H | | Comparative Example 2 Polyol I | |
| | I | II | I | II | I | II | I | II | I | II | I | II | I | II | I | II | I | II |
| Reactivity (sec.) | | | | | | | | | | | | | | | | | | |
| Gel time | 42 | 58 | 36 | 50 | 22 | 28 | 20 | 24 | 22 | 25 | 21 | 24 | 20 | 27 | 20 | 26 | 80 | 110 |
| Tack free time | 48 | 63 | 46 | 62 | 28 | 35 | 25 | 31 | 27 | 33 | 25 | 32 | 24 | 32 | 26 | 31 | 92 | 138 |
| Physical properties | | | | | | | | | | | | | | | | | | |
| Density (kg/m$^3$) | 27.1 | 26.0 | 28.9 | 27.6 | 29.7 | 29.1 | 28.9 | 29.3 | 29.4 | 29.0 | 28.8 | 27.8 | 28.7 | 27.0 | 28.7 | 27.2 | 29.6 | 28. |
| Compression strength Parallel | 1.79 | 1.74 | 1.36 | 1.61 | 1.51 | 1.76 | 1.58 | 1.70 | 1.63 | 1.67 | 1.71 | 1.66 | 1.75 | 1.43 | 1.37 | 1.49 | 0.93 | 0.83 |
| Vertical (kg/cm$^2$) | 0.42 | 0.54 | 0.38 | 0.36 | 0.35 | 0.41 | 0.37 | 0.34 | 0.31 | 0.33 | 0.37 | 0.35 | 0.44 | 0.34 | 0.36 | 0.38 | 0.22 | 0.37 |
| Brittleness (%) | 24 | 6 | 48 | 5 | 22 | 4 | 19 | 4 | 24 | 5 | 17 | 3 | 19 | 0 | 20 | 5 | 28 | 13 |
| Closed cell foaming rate (%) | 82 | 87 | 85 | 88 | 86 | 89 | 87 | 89 | 83 | 86 | 86 | 89 | 87 | 91 | 90 | 91 | 66 | 79 |
| Heat resistance weight reduction | 10 | 14 | 9 | 13 | 7 | 15 | 8 | 12 | 9 | 15 | 10 | 13 | 11 | 16 | 21 | 27 | 17 | 23 |

TABLE 3-continued

| | Foaming test results Polyols | | | | | | | | | | | | | | | | | |
|---|---|---|---|---|---|---|---|---|---|---|---|---|---|---|---|---|---|---|
| Items | Example 1 Polyol A | | Example 2 Polyol B | | Example 3 Polyol C | | Example 4 Polyol D | | Example 5 Polyol E | | Example 6 Polyol F | | Example 7 Polyol G | | Comparative Example 1 Polyol H | | Comparative Example 2 Polyol I | |
| Foaming formulation | I | II | I | II | I | II | I | II | I | II | I | II | I | II | I | II | I | II |
| (%) after 2 days at 200° C. Flame retardancy (ASTM D 1692) Distance burned (mm) | 0 | 22 | 0 | 27 | 0 | 13 | 0 | 15 | 0 | 19 | 0 | 22 | 10 | 28 | 25 | 42 | 21 | 23 |

In Examples 1 to 7 wherein Polyols A to G were used in accordance with the present invention, the compression strength, the heat resistance and the flame retardancy are superior and the resistance to brittleness and the closed-cell foaming rate are also satisfactory. In the case where a polyether polyol is used as in Comparative Example 1, the heat resistance and the flame retardancy are inferior. In the case where a usual polyester polyol is used as in Comparative Example 2, no good results are observed, probably because the compatibility with R-11 is poor.

What is claimed is:

1. A process for producing a urethane-modified polyisocyanurate foam, comprising:
reacting (A) a polyol of which at least a portion is a polyester ether polyol having a hydroxyl value of from about 100 to 500 prepared by reacting from 0.5 to 2.0 equivalents of an aromatic polybasic carboxylic acid anhydride and from 1 to 5 equivalents of an alkyleneoxide with one equivalent of at least one member selected from the group consisting of a polyhydric alcohol, a polyhydric alcohol-alkyleneoxide adduct and a polyhydric phenol-alkyleneoxide adduct, and (B) a polyisocyanate compound in an excess amount relative to the polyol in the presence of (C) an isocyanate trimerizing catalyst and (D) a foaming agent.

2. The process according to claim 1, wherein the polyester ether polyol is obtained by reacting a bisphenol A-alkyleneoxide adduct, phthalic anhydride and ethyleneoxide and/or propyleneoxide.

3. The process according to claim 1, wherein the polyester ether polyol is obtained by reacting a dihydric alcohol or its alkyleneoxide adduct, phthalic anhydride, and ethyleneoxide and/or propyleneoxide.

4. The process according to claim 3, wherein the dihydric alcohol is at least one member selected from the group consisting of ethylene glycol, propylene glycol and 1,4-butanediol.

5. The process according to claim 3, wherein the dihydric alcohol-alkyleneoxide adduct is at least one member selected from the group consisting of diethylene glycol, dipropylene glycol and an ethyleneoxide and/or propyleneoxide adduct of at least one polyol selected from diethylene glycol, dipropylene glycol, ethylene glycol, propylene glycol and 1,4-butanediol.

6. The process according to claim 1, wherein the polyester ether polyol has a hydroxyl value of from 150 to 400.

7. The process according to claim 1, wherein the polyisocyanate compound is an aromatic polyisocyanate compound.

8. The process according to claim 1, wherein the polyol is used in such an amount that the ratio of the number of isocyanate groups to the number of hydroxyl groups is from 2 to 5.

9. The process according to claim 1, wherein at least 50% of the total polyol reacted with said polyisocyanurate is said polyester ether polyol.

10. The process according to claim 9, wherein from about 70% to about 100% by weight of the total polyol reacted with said polyisocyanate is said polyester ether polyol.

11. The process according to claim 1, wherein said polyisocyanate compound is polymethylene polyphenyl isocyanate, diphenylmethane diisocyanate or tolylene diisocyanate.

12. The process according to claim 1, wherein said isocyanate trimerizing catalyst is an alkali metal, lead or iron salt of a carboxylic acid, a dialkylaminoalkyl phenol, a trialkylamine, an onorganic base, an alkali metal alcoholate, a phosphine compound or a quaternary ammonium salt.

13. The process according to claim 11, wherein said foaming agent is a halogenated hydrocarbon.

14. The process according to claim 1, wherein the amount of said trimerization catalyst ranges from 0.01 to 5 parts by weight and the amount of said foaming agent ranges from 5 to 50 parts by weight, each per 100 parts by weight of said polyisocyanate compound.

* * * * *